United States Patent [19]
Rothenberger

[11] 3,861,432
[45] Jan. 21, 1975

[54] WORK TABLE FOR CLAMPING AGAINST PLANAR SURFACES

[76] Inventor: Gunter Rothenberger, Landgraf-Friedrich-Strasse 21, D-6380 Bad Homberg, Germany

[22] Filed: Oct. 29, 1973

[21] Appl. No.: 410,871

[30] Foreign Application Priority Data
June 5, 1973 Germany.................... 2328480

[52] U.S. Cl................ 144/286 R, 108/151, 269/97
[51] Int. Cl.............................................. B25h 1/04
[58] Field of Search....................... 269/88, 97, 309; 144/286 R; 108/151, 152; 211/90, 105.4; 248/228

[56] References Cited
UNITED STATES PATENTS

| | | | |
|---|---|---|---|
| 1,209,350 | 12/1916 | Steiner.......................... | 269/208 X |
| 1,253,486 | 1/1918 | Hammer........................ | 211/105.4 |
| 1,426,660 | 8/1922 | Magalski....................... | 144/286 R |
| 1,539,059 | 5/1925 | Sawyers ....................... | 144/286 R |
| 1,550,751 | 8/1925 | Sinkler.......................... | 269/97 |

*Primary Examiner*—Roy Lake
*Assistant Examiner*—Neil Abrams
*Attorney, Agent, or Firm*—Joseph F. Padlon

[57] ABSTRACT

A work table arrangement in which a C or U-shaped frame supports a work plate and two clamping plates. One of the clamping plates may be positioned in the frame at predetermined increments to provide coarse adjustment. The other clamping plate is supported by the frame through a threaded screw mechanism which allows the clamping plate to be forced under pressure against the cooperating plate. The screw mechanism provides for fine adjustment. The clamping plates may be supported by the frame so that they face each other and move toward each other or their movement is in opposite directions.

9 Claims, 3 Drawing Figures

PATENTED JAN 21 1975          3,861,432
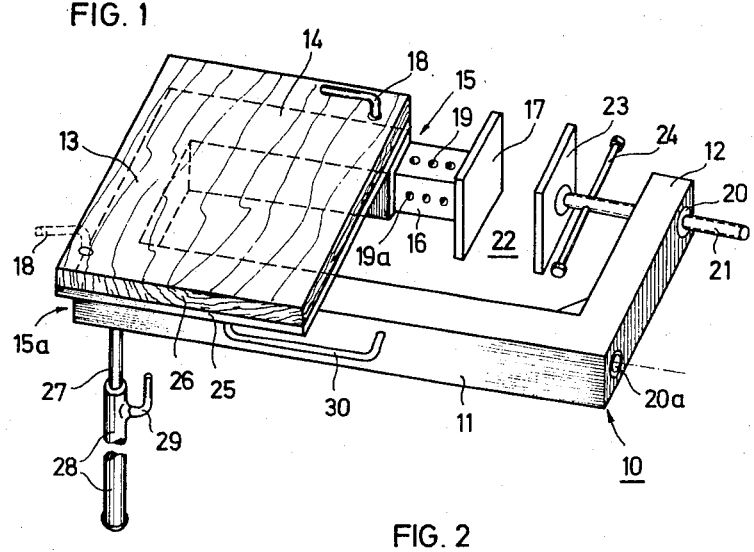
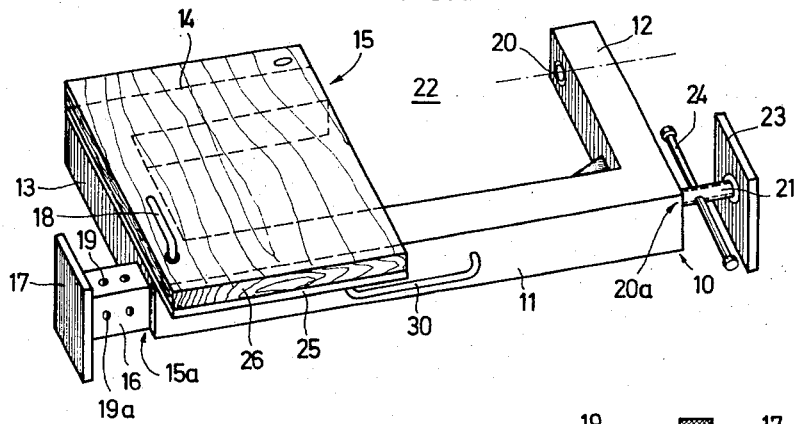
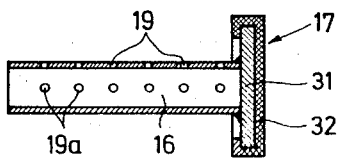

WORK TABLE FOR CLAMPING AGAINST PLANAR SURFACES

BACKGROUND OF THE INVENTION

The present invention relates to a work table for clamping against planar or normal surfaces. The work table has substantially C or U-shaped frame on which a work plate is supported. Two clamping plates are, furthermore, inserted into the frame and at least one of these two clamping plates may be forced or moved against the other plate.

Work tables of the preceding species are used, for example, in installations involving repair and new construction, where conventional work benches are difficult to use because of difficulties incurred in transportation. The work table in accordance with the present invention can be carried similarly as a suitcase without the danger of damaging stair wells, or stair walls, which occurs often when transporting conventional work benches. The work benches or work table in accordance with the present invention, furthermore, prevents scratching of the floor surface, since they are secured against shifting motions for side movements.

In a work table known in the art, the clamping plates are oriented so that their clamping surfaces face each other, with the clamping plates arranged in a frame opening. One of the two clamping plates is held in a leg of the frame by means of a threaded shaft or spindle. By actuating the threaded spindle or shaft, it is possible to secure the work table against a wall, a wall projection, a column or a post. For purposes of securing or fastening in place within the frame of a door or within a door opening, it is not possible to use such a work table.

A work table is also known in the art for purposes of clamping against normal or planar surfaces, in which the frame consists of a straight and constant rectangular profile. The clamping plates are arranged at both ends of the frame, and the clamping surfaces are directed away from each other. One of the two clamping plates is here also held in place by a threaded spindle or shaft which, in turn, is supported by the frame. Upon actuation or operation of the threaded shaft or spindle, the work table can be secured in place within a door opening, between walls, or between two neighboring posts. Such a work table, however, is not adaptable for securing or fastening against a wall projection or against a single column.

Since it is generally not known what conditions are available for securing the work table at the location of installation it has been necessary, in the past, to take along both types of work tables. This procedure was considerably inconvenient and resulted in considerable expense.

SUMMARY OF THE INVENTION

It is an object of the present invention to provide a work table which may be selectively used in conjunction with wall projections or in wall openings.

Another object of the present invention is to provide a work table of the foregoing character which may be readily transported and easily used.

A further object of the present invention is to provide a work table which may be economically fabricated and assembled.

A still further object of the present invention is to provide a work table which occupies substantially little space.

The objects of the present invention are achieved by providing a work table in which the frame has openings for receiving the clamping plates in a manner which allows these clamping plates to be directed towards each other or against each other.

When using openings for receiving the clamping plates in the frame, this expression for the openings is to be understood as used for the purpose of receiving the clamping plates or any extensions of such plates. Since one of the two clamping plates is generally not rotatable, such clamping plates has a cross-section which is non-circular. At the same time, such non-circular cross-section corresponds to the cross-section of the opening in the frame which receives the non-rotatable plate.

One of the two clamping plates, moreover, must be stressable or forcible against the other plate. For this purpose, it is advantageous to use a threaded screw arrangement. The opening in the frame for receiving such a threaded screw arrangement is, in this case, of the present invention, a threaded bushing or a threaded opening cut directly into the frame. The clamping plates which is not rotatable and which has a non-circular cross-section along its extended link, is telescopically movable in longitudinal direction within the frame. A bolt member is used in conjunction with this non-rotatable clamping plate for obtaining coarse adjustment in positioning this clamping plate. At the same time, the clamping plate used in conjunction with the threaded screw arrangement, is used for fine adjustment in positioning.

With the arrangement of the present invention, the advantage is realized that without fabrication or manufacturing complexities, it is possible to produce a work table which has less weight and occupies less space than one of the conventional work tables which is capable of performing only one function. With the work table of the present invention, furthermore, it is not necessary to transport and store a second work table which is capable of providing the other function. When arriving at the location where the work table is to be utilized, furthermore, it is possible to adapt the work table, in accordance with the present invention, rapidly to the required function and mode of operation.

A work table, in accordance with the present invention, is arranged in a particularly advantageous manner when one leg of the frame is mounted parallel to the lengthwise core of the frame, and is provided with an insertion opening at the end of the leg. This insertion opening is designed to receive an attachment of one of the clamping plates. The other leg of the frame structure is provided with an insertion opening designed for receiving a threaded screw mechanism used in conjunction with the other clamping plate. The core of the frame, furthermore, is provided in accordance with the present invention, with another insertion opening for receiving the first-mentioned clamping plate, and a duplicate insertion opening at the other end of the core for receiving the threaded screw mechanism. The frame structure for this purpose, is advantageously constructed in the form of a hollow rectangular profile, which makes it possible to hold the non-circular attachment to the clamping plate, while at the same time, permitting longitudinal displacement of the clamping plate with respect to the insertion opening.

The C or U-shaped frame, however, is not required to be in the form of a box-shaped or rectangular-shaped hollow profile. It is also possible to omit the leg which lies between the frame core and the leg parallel thereto. With such design, the work plate assumes the mechanical function of the omitted part of the frame. The work plate is preferably made of metal and is welded to the remaining frame members. If, on the other hand, the frame is constructed in the form of a continuous hollow profiled member, then the work plate can be made entirely of wood and may be attached to the frame so that it is also removable therefrom.

In order to make it possible to clamp against surfaces which are to be secured without causing damage to the surfaces, while at the same time, avoiding slippage, it is further provided in accordance with the present invention that the clamping plates are provided with covering caps made of elastic material. The cap may be made to enclose entirely the clamping plates, and may be made of rubber or an elastic plastic type of material having similar properties. The cap may be furthermore, simply pulled over the clamping plates and for this reason, may be readily exchanged for damaged or worn caps.

The clamping plates have preferably rectangular surfaces in which the side edges are dimensioned in the ratio of 1 : 2, or approximately 100 : 200 mm. At the same time, the attachment to the clamping plate and which is inserted into the insertion opening of the frame, may also have a rectangular cross-section corresponding to the opening in which the attachment is inserted. With this arrangement it is possible to rotate the clamping plate by 90°. In this manner, it is possible to match the width of the contact surface with the strength of the wall, whereby full-surface support is obtained at all times.

The work tables that have been conventionally used and are known in the art, are constructed of either metal or wood. To provide the work surfaces with means that may meet the requirements desired, the work plate may be made either of wood or material which is similar in properties to wood. The metal work plate may be provided with simple bores or holes through which fastening bolts may be passed. It is also advantageous, in accordance with the present invention, to equip the work plate with means for holding and retaining tools, so that the user of the worktable has the required tools easily accessible, without having to bend to reach the tools. It is also desirable that no auxiliary or additional holding surfaces be required for this purpose of holding the tools. For this purpose, therefore, bores may be provided, for example, in the work plates.

When work is involved which subjects the work table to considerable shock and vibration as, for example, when working with a hammer or thread cutting arrangement, it may be desirable that the work table be secured firmly in place against rotational motion or tipping. For this purpose, it is possible to mount a support beneath the work plate, and have this support reach the floor or ground. The attachment of the support is achieved substantially by turning the support in a threaded receptacle on the sides of the work table which lies opposite to the sides on which the clamping takes place. The support is advantageously constructed in a telescopic manner, and is provided with a firm positioning arrangement. The telescopic arrangement allows the work table to be mounted at a desired height within a predetermined region. For transportation purposes, retaining springs may be provided on the work table for the supports.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a work table for clamping against wall projections or columns, in accordance with the present invention;

FIG. 2 is a perspective view of a work table for attachment within a wall opening; and FIG. 3 is a cross-sectional view through a clamping plate with attachment and an elastic protective cap, in accordance with the present invention.

DESCRIPTION OF THE PREFERRED EMBODIMENTS

Referring to the drawing and in particular to FIG. 1, a C-shaped frame 10 has a core 11, and a leg 12 oriented at right angle to the core 11. A second leg 13 connected to the core 11, has an end portion 14 parallel to the core 11. The frame 10 is assembled of a structure having a rectangular-shaped profile or cross-section which is able to sustain the forces that are involved in performing the clamping action of the work table, in accordance with the present invention.

The leg end 14 has an insertion opening 15, into which an attachment or extension 16 may be inserted. This attachment 16 is attached to a clamping plate 17. The leg end 14 and attachment 16 are arranged with respect to each other, so that the attachment or extension 16 of the clamping plate 17, may be inserted into the leg end 14 at varying positions. A bolt 18 which passes through bore 19 in the extension or attachment 16, is used to fasten in place the attachment 16 at a desired position.

A threaded screw arrangement is provided directly across from the insertion opening 15. This threaded screw arrangement is held by the leg 12, and has a shaft or threaded spindle 21. The threaded screw arrangement 20 is held within a threaded opening in the leg 12.

The threaded spindle or shaft 21 carries a clamping plate 23 within the frame opening 22. The clamping plate is rotatably movable on the spindle or shaft 21. The two clamping plates 17 and 23 may be brought together through rotation of the threaded spindle or shaft 21. Turning of the threaded spindle or shaft 21 may be achieved by the cross bar 24. The extension or attachment 16 cooperates with the bolt 18 to provide for coarse adjustment of the clamping plate 17, whereas the threaded spindle or shaft 21 provides for fine adjustment for the clamping action.

The frame core 11 is provided at one end with a further insertion opening 15a. Directly opposite this opening 15a, is, at the other end of the frame core, a still further threaded screw arrangement 20a. The insertion openings 15 and 15a are identical, and the supports for the threaded screw arrangements 20 and 20a are also identical. In this manner, the extension or attachment 16 may be selectively inserted into the opening 15a, while the threaded spindle or shaft 21 may be turned into the threaded mounting 20a. The arrangement of this combination may be seen from FIG. 2.

Mounted on the frame 10 is a work plate 25 which extends along that part of the frame, which corresponds to the length of the leg end 14. The work plate 25 consists of a steel member several millimeters thick. A wood member 26 lies directly upon the steel work plate 25, and is of the same size. The wood plate 26 may be connected to the work plate 25 by means of bolts or screws so that the wood plate may be readily removed. The attachment of the screws or bolts is achieved from the lower side of the work plate and through bores, not shown in the drawing.

Beneath the work plate 25 and in the frame 10, is a support 27 which may be attached to the frame and removed as required. The support 27 is arranged in a telescopic manner with tube-shaped extensions 28. These tube extensions allow the support 27 to be made to a desired length, and then locked in place by means of a handle 29.

Screws, bolts and other forcing devices can be attached to the work plate 25 or the wood plate 26 for aiding the user in his work. A carrying handle 30 serves for transporting the work table in an easy manner.

In FIG. 2, it may be seen that the clamping surfaces of the clamping plate 17 and 23 are directed in opposite directions from each other, so that the extension 16 and the threaded spindle shaft 21 are now within openings 15a and 20a, not previously used when using the work table in accordance with the arrangement of FIG. 1. When arranged as shown in FIG. 2, the work table is adapted for installation within a wall opening. In this arrangement, the longitudinal movement of the attachment or extension 16 with respect to the frame 12 provides for coarse adjustments by means of the bolt 18 and bores 19, whereas the threaded shaft or spindle 21 provides for fine adjustment. The leg 13 is that part of the frame 10 which may be omitted when the work plate 25 is made of metal or steel, and is welded to the frame core 11 and the leg end 14.

The detailed construction of the clamping plates 17 together with the attachment or extension 16, is shown in FIG. 3. The clamping plate 17 has a metallic base plate 31 which is substantially enclosed by a cap 32 made of elastic material. This cap 32 may, for example, be pulled directly over the base plate 31. The cap 32 may be removed and replaced whenever desired. The bores 19 serve for the core positioning described above. A second row or group of bores 19a may be provided at right angle to the bores 19 on the attachment 16, for allowing the bolt 18 to be located at 90° from the previous position shown in FIG. 1.

It will be understood that each of the elements described above, or two or more together, may also find a useful application in other types of work tables, differing from the types described above.

While the invention has been illustrated and described as embodied in work tables, it is not intended to be limited to the details shown, since various modifications and structural changes may be made without departing in any way from the spirit of the present invention.

I claim:

1. A work table for clamping against planar surfaces comprising, in combination, a substantially open-loop-shaped frame member; a work plate on said frame member; two clamping plates arranged on said frame member with at least one clamping plate being movable with respect to the other plate, said frame member having two insertion openings for mounting one of said clamping plates in opposite directions, the other one of said clamping plates having a threaded spindle; two threaded screw means for receiving and mounting said spindle of said other clamping plate, each of said screw means corresponding to one respective insertion opening, each screw means and respective insertion opening being spaced directly across from each other, said clamping plates being movable toward each other for applying clamping forces directed toward each other when said clamping plates are in one respective insertion opening and threaded screw means, said clamping plates being movable away from each other for applying clamping forces directed away from each other when said clamping plates are in the other respective insertion opening and screw means.

2. The work table as defined in claim 1, wherein said frame member is substantially C-shaped.

3. The work table as defined in claim 1, wherein said frame member is substantially U-shaped.

4. The work table as defined in claim 1 including an extension member attached to one of said clamping plates, said frame member having a leg terminating in an opening for receiving said extension member of said clamping plate, said leg of said frame member being parallel to the core axis of said frame member, said frame member having a second leg with a threaded opening; a threaded shaft member attached to the other one of said clamping plates and rotatable within said threaded opening of said second leg, said second leg having an auxiliary threaded opening spaced from said first-mentioned threaded opening, and said leg for receiving said extension member having an auxiliary opening spaced from said first-mentioned opening for receiving said extension member.

5. The work table as defined in claim 1, including elastic cap means for substantially enclosing said clamping plates.

6. The work table as defined in claim 1, including a plate member of wood-like material on said work plate.

7. The work table as defined in claim 1 including means for holding tools on said work plate.

8. The work table as defined in claim 1 including support means attached below said work plate and reaching towards the ground.

9. The work table as defined in claim 4 wherein said clamping plates have rectangular-shaped clamping surfaces, said extension member and said opening for receiving said extension member having rectangular-shaped cross-sections.

* * * * *